(12) United States Patent
Shaw et al.

(10) Patent No.: US 8,447,261 B2
(45) Date of Patent: May 21, 2013

(54) INTEGRATING MULTIMEDIA AND VOICEMAIL

(75) Inventors: Venson M. Shaw, Kirkland, WA (US); Alexander E. Silverman, Mercer Island, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 629 days.

(21) Appl. No.: 12/606,503

(22) Filed: Oct. 27, 2009

(65) Prior Publication Data

US 2011/0098022 A1 Apr. 28, 2011

(51) Int. Cl.
*H04M 11/00* (2006.01)
*H04M 11/10* (2006.01)
*H04M 1/00* (2006.01)

(52) U.S. Cl.
USPC .............. 455/403; 455/550.1; 455/556.2; 370/217; 370/338; 370/353

(58) Field of Classification Search
USPC . 455/413, 558.1, 403, 550.1, 556.2; 370/217, 370/338, 352; 379/67.1, 164; 704/257, 273; 725/32
See application file for complete search history.

(56) References Cited

U.S. PATENT DOCUMENTS

| | | | |
|---|---|---|---|
| 6,373,817 B1 * | 4/2002 | Kung et al. | 370/217 |
| 6,826,173 B1 * | 11/2004 | Kung et al. | 370/352 |
| 7,006,614 B2 * | 2/2006 | Feinberg et al. | 379/164 |
| 2006/0116885 A1 * | 6/2006 | Shostak | 704/273 |
| 2006/0259924 A1 * | 11/2006 | Boortz | 725/32 |
| 2007/0087774 A1 * | 4/2007 | Richardson et al. | 455/550.1 |
| 2007/0087775 A1 * | 4/2007 | Richardson et al. | 455/550.1 |
| 2007/0088553 A1 * | 4/2007 | Johnson | 704/257 |
| 2007/0116197 A1 * | 5/2007 | O'Neill | 379/67.1 |
| 2009/0022129 A1 * | 1/2009 | Karaoguz et al. | 370/338 |
| 2011/0098022 A1 * | 4/2011 | Shaw et al. | 455/413 |

* cited by examiner

*Primary Examiner* — William D Cumming
(74) *Attorney, Agent, or Firm* — Woodcock Washburn LLP

(57) ABSTRACT

Integrated multimedia voicemail systems and methods allow the creation of voicemail with associated multimedia content. A user can compose a voicemail and select or create multimedia content to be associated with the voicemail. A user can associate files, webpage addresses, applications, and user-created content with a voicemail. A user may operate an interface on a user device to select content and instruct a voicemail system to associate such content with a voicemail. The voicemail with integrated multimedia content may be an originating voicemail or a voicemail in response to another voicemail.

20 Claims, 9 Drawing Sheets

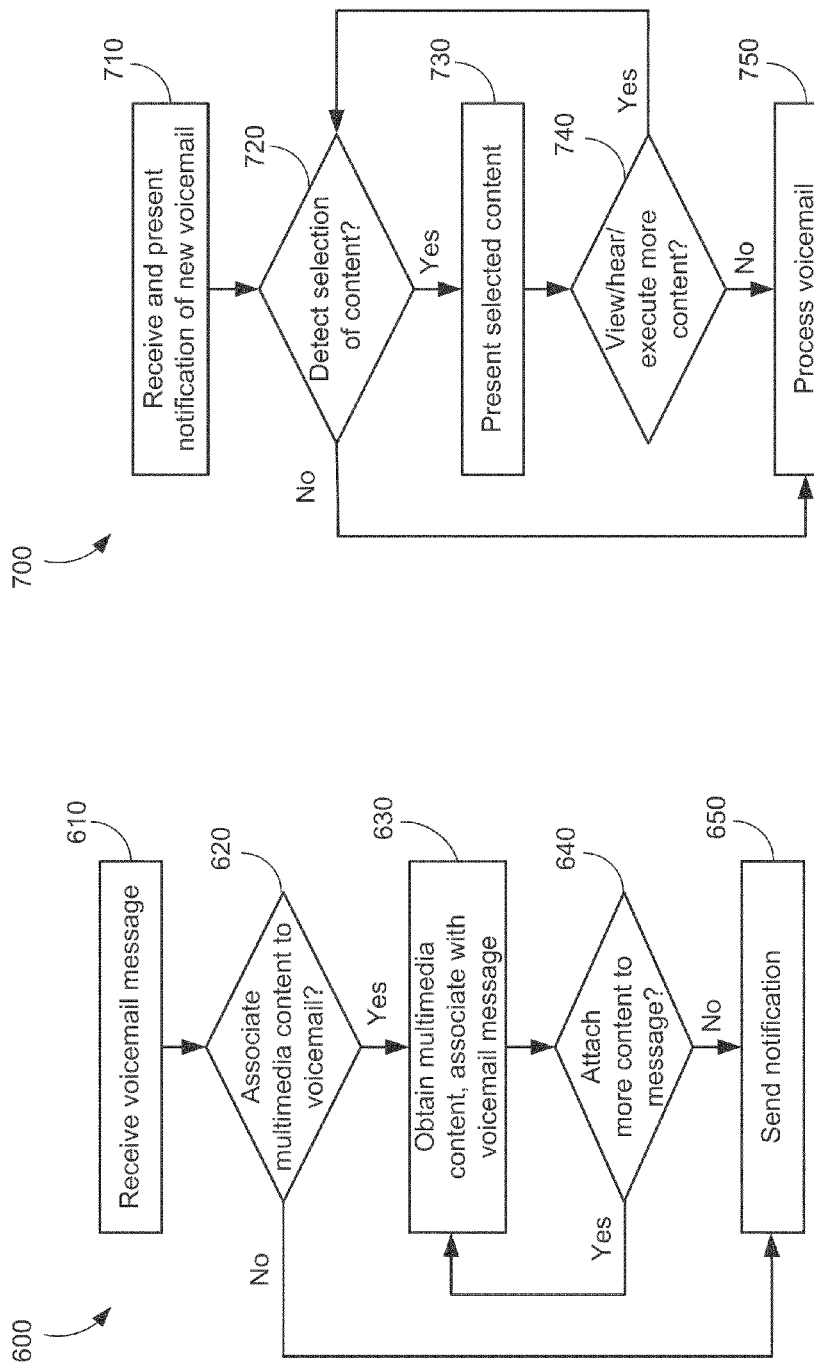

INTEGRATING MULTIMEDIA AND VOICEMAIL

TECHNICAL FIELD

The technical field generally relates to wireless communications and more specifically relates to integration of multimedia content and visual voicemail.

BACKGROUND

Communications devices such as cellular telephones, mobile communication devices, personal digital assistants (PDAs), laptops, and the like are becoming more prevalent as technology advances and makes these devices more powerful and more affordable. These devices are also being constructed with increasing capabilities and can now perform functions that have in the past been performed by dedicated devices. For instance, a common mobile communications device today may have computing capabilities, the ability to communicate with data networks such as the internet, a display than can render high quality still images and video, audio capabilities that allow the device to play music and video soundtracks, as well as the ability to place and receive traditional mobile telephone calls and text messages.

The expanding capabilities of mobile communications devices have allowed the improvement and enhancement of more traditional technologies. For example, voicemail has traditionally been an audio-only feature that requires a telephone connection to a voicemail server. A user would receive some sort of notification that a voicemail is available, and the user would then have to dial into a voicemail server to listen to the message. Thanks to technological advances, visual voicemail is available on many mobile devices. Visual voicemail presents a visual interface to a user's voicemail box and allows the user to manipulate voicemail in various ways that were previously not possible. A user may delete or save voicemail through the visual interface without having to place a call to a voicemail server. A user may also be able to see who the voicemail is from, when it was sent or received, and other characteristic of the voicemail without actually placing a call to a voicemail server. In some implementations, voicemail can be converted to text using speech recognition technology and then read through the visual voicemail interface or transmitted, for example as an email. Current visual voicemail implementations have been limited to manipulations of traditional voice messages.

SUMMARY

Systems and methods for integrating multimedia content with voicemail are disclosed. A voicemail system and/or user device may provide an interface for a user to select multimedia content to be attached or associated with a voicemail. The content may be located on a user device or on a remote device, or may be created by the user in the process of selecting content to be associated with a voicemail. A user may select any type of multimedia content or links to such content. For example, a use may select a music, video, or executable file located on the user's device, or the user may select a link or other identifying information that will allow a device to locate the associated content. A user may also select a webpage and the voicemail system or the user device may associate the network address of the webpage with the voicemail. A user may specify a tag or identifier within the voice portion of a voicemail that will trigger an automatic rendering of the content when the recipient plays the voice message portion of the voicemail. Multimedia content may be executed or rendered when the recipient selects the content or otherwise instructs the system to render or execute the content. In one embodiment, the content may be rendered automatically when a tag or identifier is detected. Other embodiments and further details are set forth herein.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings:

FIG. 6 is a flowchart illustrating a non-limiting, exemplary method of implementing multimedia and voicemail integration.

FIG. 7 is a flowchart illustrating a non-limiting, exemplary method of implementing multimedia and voicemail integration.

DETAILED DESCRIPTION OF ILLUSTRATIVE EMBODIMENTS

Figure 1:
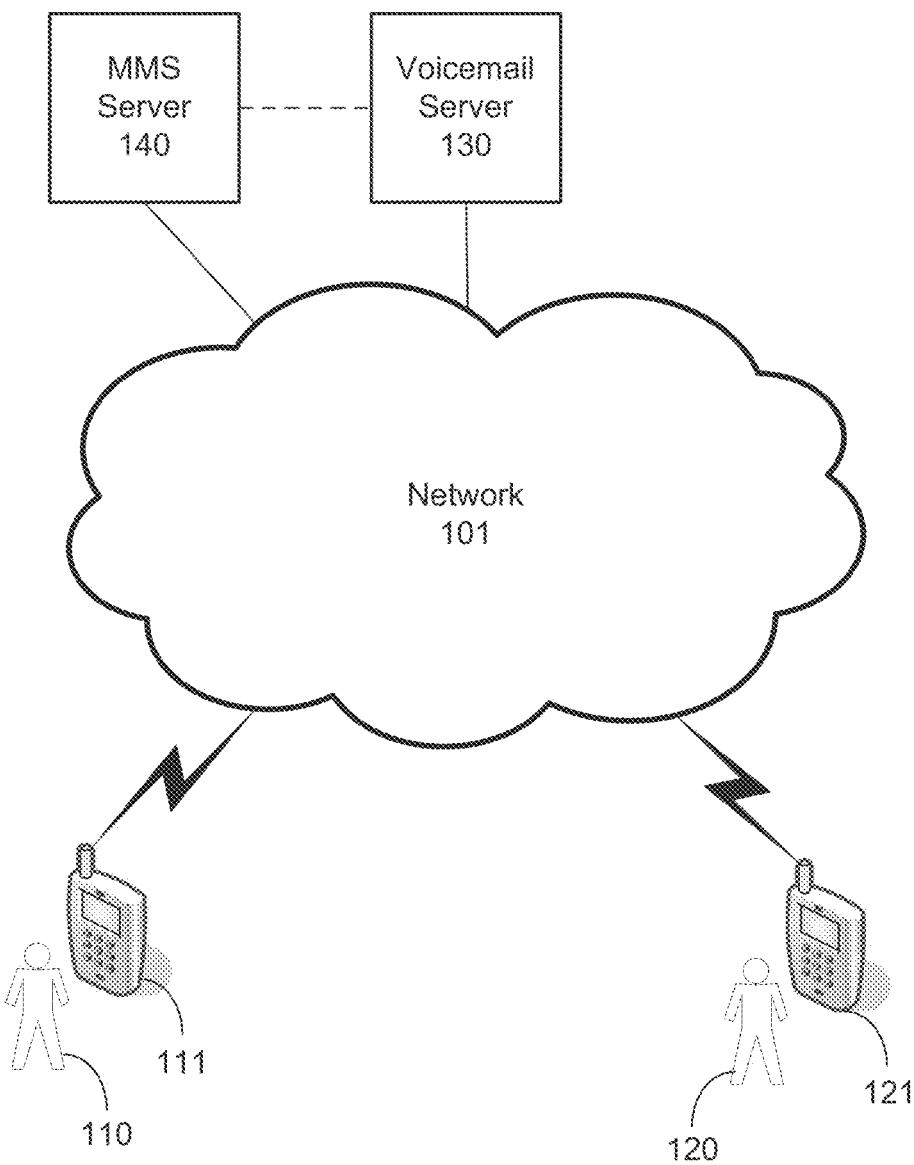
FIG. 1 is a block diagram of a non-limiting, exemplary network environment in which multimedia and voicemail can be integrated.

FIG. 1 illustrates a network environment in which one or more embodiments of multimedia and voicemail integration may be implemented. User 110 may operate wireless device 111, and user 120 may operate wireless device 121. Each of wireless devices 111 and 121 may be any type of wireless mobile communications device, including a mobile telephone, smart phone, personal data assistant (PDA), mobile computer, wireless email device, or any combination thereof. Alternatively, while wireless devices 111 and 121 as illustrated represent wireless mobile communications devices, wireless devices 111 and 121 may also represent a wired device, such as a landline telephone, computer, email device, or any other communications device or any combination thereof. All such embodiments are contemplated as within the scope of the present disclosure.

Wireless devices 111 and 121 may communicate with network 101. Network 101 may be any type of network capable of providing wireless services to wireless devices of any type. Network 101 represents any number of interconnected networks that may be composed of any number and type of wired and/or wireless network devices. Network 101 may enable wireless devices 111 and 121 to communicate with each and with other mobile devices. Additionally, network 101 may enable wireless devices 111 and 121 to communicate with computing devices such as voicemail server 130 and multimedia messaging service (MMS) server 140. Such communication may be voice, data, or a combination thereof. All such embodiments are contemplated as within the scope of the present disclosure.

User 110 may wish to call user 120 by operating wireless devices 111. Upon dialing the phone number associated with wireless device 121, user 110 may be connected to a voicemail system that allows user 110 to create a voicemail for user 120. This may be because user 120 fails to answer the call placed by user 110, or because wireless device 121 is unavailable for some reason, such as being located in an area with no wireless service, or being shut off. Alternatively, user 110 may wish to send a voicemail to user 120 without directly calling wireless device 121, and may interact with a voicemail system to create and send the voicemail to user 120. In such a situation, user 110 may be initiating a voicemail unprompted, or may be responding to a voicemail created by user 120. In one embodiment, such a voicemail system may be operated by voicemail server 130, which may be associated with a network that provides wireless communications services to either or both user 110 and user 120. Alternatively, voicemail server 130 may be owned, operated, or maintained by a third party, and may be a component of a third party system that provides voicemail services to the operator of network 101 or any other network operator. Voicemail server 130 may be any one or more computing devices and/or software capable of performing voicemail functions as described herein. Voicemail server 130 may be dedicated to performing voicemail functions, or may be a component of a device or system that performs other functions in addition to voicemail functions.

Upon connecting to voicemail server 130, user 110 may be provided with aural prompts that allows user 110 to interact with voicemail server 130. Voicemail server 130 may solicit and store a voice message from user 110 using traditional telephony means. Voicemail server 130 may also prompt user 110 to attach or associate multimedia content with the voicemail. Note that voicemail server 130 may prompt user 110 for multimedia content before or after user 110 is prompted for and/or provides the audible voice message portion of a voicemail. The prompt for multimedia content may be accomplished by asking user 110 audibly whether user 110 would like to attach multimedia content. Alternatively, or in conjunction, voicemail server 130 may communicate a prompt to attach or associate multimedia content with the voicemail to wireless device 111 by using data communication. Such communication may cause an interface to be provided to user 110 on wireless device 111 that allows user 110 to select multimedia content to be associated with the voicemail. In one embodiment, such communication may operate in conjunction with software configured on wireless device 111 that is designed to facilitate the attachment of multimedia content to voicemail. Alternatively, such communication may operate in conjunction with software on wireless device 111 that is not dedicated to multimedia voicemail functions. All such embodiments are contemplated as within the scope of the present disclosure.

In response to such a prompt, user 110 may respond in the affirmative and/or may specify multimedia content to be associated with the voicemail user 110 has created by interacting with voicemail server 130. In one embodiment, upon responding in the affirmative, user 110 may be connected to or otherwise interact directly or indirectly with MMS server 140, which may perform some or all of the multimedia voicemail association functions described herein. MMS server 140 may be any one or more computing devices and/or software capable of performing MMS functions as described herein. MMS server 140 may be dedicated to performing MMS functions, or may be a component of a device or system that performs other functions in addition to MMS functions. MMS server 140 may be the same device or system as voicemail server 130, or may be a separate device or system. Alternatively, all the functions described herein may be performed entirely by voicemail server 130 or components thereof. All such embodiments are contemplated as within the scope of the present disclosure.

In one embodiment, user 110 may provide or specify multimedia content audibly by stating an identifier of the multimedia content. For example, a user may associate a webpage with a voicemail by stating the webpage's address which may then be recognized by speech recognition components of voicemail server 130. Voicemail server 130 may then obtain the webpage at the specified address and associate the webpage with the voicemail. Alternatively, voicemail server 130 may associate the webpage address with the voicemail which may allow user 120 to view the webpage using an appropriately equipped device. In an alternate embodiment, a user may associate text content with a voicemail by speaking the text content which may then be recognized by speech recognition components of voicemail server 130 and converted into a text file or stored in some manner and associated with the voicemail. In another embodiment, user 110 may provide a network address of a file, such as a video or music file, which voicemail server 130 may then use to obtain or otherwise associate the file with the voicemail. Any other means of obtaining or otherwise associating multimedia content with a voicemail through the use of aural interaction with a voicemail system or device are contemplated as within the scope of the present disclosure.

In an alternative embodiment, user 110 may provide or specify multimedia content using an interface provided and/or operated by voicemail server 130, in one embodiment in conjunction with wireless device 111. Such an interface may be specially designed for multimedia content integration with voicemail, or may be generalized. For example, a software client may be installed on wireless device 111 that facilitates associating multimedia content with voicemail. Alternatively, voicemail server 130 may provide a webpage address to wireless device 111 via a data communication that allows wireless device 111 to interact with voicemail server 130 over network 101. In such an embodiment, voicemail server 130 may also issue one or more instructions to wireless device 111 that cause wireless device 111 to execute a browser application and present the webpage at the specified webpage address to user 110. This may be done automatically without requiring actions on the part of user 110. In some embodiments, network 101 may include the internet, and the webpage address may be an internet webpage address. Any other means of providing a data, visual, or other type of interface to a user for the purpose of allowing the user to specify multimedia content to be associated with a voicemail are contemplated.

The content may be specified by user 110 operating wireless device 111 to select files or provide input to voicemail server 130. Alternatively, user 110 may operate wireless device 111 to instruct voicemail server 130 as to where, when, and/or how to obtain multimedia content to be associated with a voicemail. Any means of specifying multimedia content may be used, and all such means are within the scope of the present disclosure.

Figure 2:
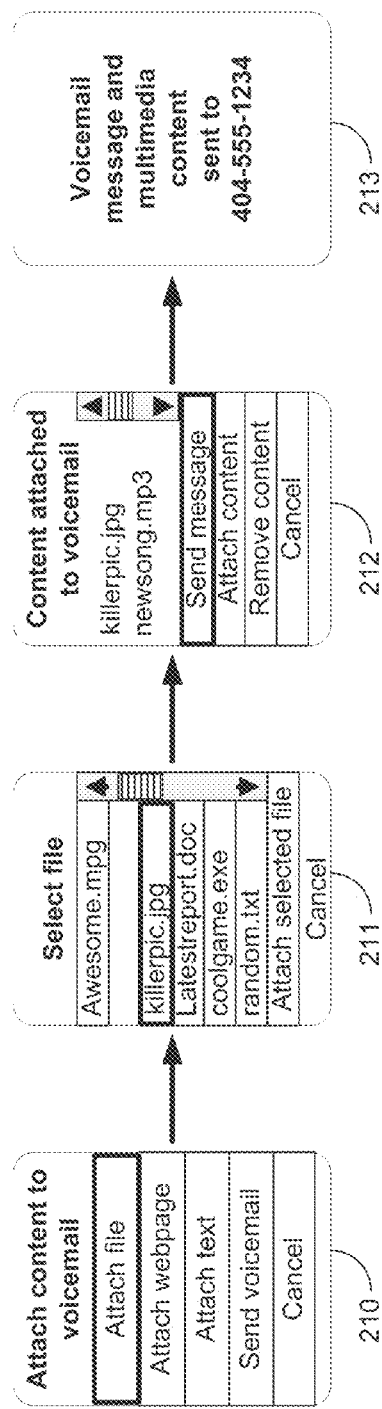
FIG. 2 illustrates example, non-limiting, representations of user interfaces that may be used in connection with multimedia and voicemail integration.

FIG. 2 illustrates a non-limiting, exemplary interface for providing multimedia content to a voicemail server or system to be associated with a voicemail. The elements of FIGS. 2, 3, 4, and 5 may be screen images presented to a user on a visual display device, such as the display of wireless device 111. A user may interact with the screen images using one or more input devices such as a virtual or physical key pad, a virtual or physical key board, a mouse, a trackball, a touchpad, etc. Such interaction may include or result in communication with a voicemail server or system, a MMS server or system, or a combination thereof. In some embodiments, a user may be presented with the screens shown in FIGS. 2, 3, and 4 when originating a voicemail that is not responsive to another voicemail, for example when leaving a voicemail for a user who did not answer his or her mobile device. In such embodiments, the voicemail server or system with which the user interacts may be that of the service provider that provides wireless service to a call recipient. Alternatively, in some embodiments, a user may be presented with the screens shown in FIGS. 2, 3, and 4 when responding to a received voicemail. In such embodiments, the voicemail server or system with which the user interacts may be that of the user's wireless service providers. A user receiving an original or a responding voicemail may be presented with the screens of FIG. 5 or screens similar, and in either implementation, the screens of FIG. 5 may be provided by or facilitate interaction with a voicemail or MMS server or system of the recipient or composer of the voicemail. All variations on these configurations are contemplated as within the scope of the present disclosure.

At screen 210, a user may be prompted to associate multimedia content with a voicemail. Note that, although not shown in FIG. 2, screen 210 may be preceded by a screen or other interface that inquires whether the user would like to associate multimedia content with a voicemail. Alternatively, a user may be presented with an interface such as screen 210 that presents options for the user that include both content association options and a voicemail sending option. Any alternative configuration or presentation of options may be used, and all such alternatives are contemplated as within the scope of the present disclosure. Note that "attach", "associate", and related terms as used herein indicate content that is associated in some way with a voicemail.

Screen 210 may present several multimedia attachment options to the user. As shown on screen 210, a user may be offered the option to attach a file, a webpage, or text to a voicemail. Other options to attach any general or specific type of multimedia may be presented to the user and all such options and combinations thereof are contemplated as within the scope of the present disclosure. The user may also be offered options that are not directly related to multimedia attachment, such as the option to cancel the voicemail, which may generate instructions to a voicemail server to delete any voicemail data or voice recordings already acquired and terminate the connection with the user's device. The option to send the voicemail may also be presented to the user, which may generate instructions to a voicemail server to deliver the voicemail or a notification of the voicemail to the intended recipient. The option to send the voicemail may be presented to a user at any point, and may result in a voicemail being sent with no multimedia content or with any multimedia content that has already been associated with the voicemail.

In one embodiment, upon selecting an option to attach a file to a voicemail, a user may be presented with a screen for selecting a file, an example of which is shown in screen 211. A user may select any type of file, including a music file, video file, image file, word processing document, executable file or application, etc. The files available for selection and attachment to a voicemail may be in any format. File types and formats may be restricted by the voicemail server or system and/or the provider that maintains the voicemail server or system. Such restrictions may be based upon file size, type, results of scanning (such as virus scanning) or any other criteria. Alternatively, the voicemail server, system, or provider may place no restrictions on the sizes, types and/or formats of files that can be associated with a voicemail. The file selected may be located locally, for example on a user's mobile communications device, or remotely on another device or system.

Screen 211 may also provide other options, including the option to proceed with attaching the selected file and the option to cancel the file selection and not attach any file. In some embodiments, multiple files may be selected at screen 211 and attached with one activation of an attachment button (labeled "Attach selected file" in screen 211.) Alternatively, a user may be required to select one file at a time for association with a voicemail.

Upon selecting the desired file or files and activating an attachment control, the user may be presented with screen 212. Screen 212 may present to the user a visual listing or confirmation of files currently associated with a voicemail. Screen 212 may also present a listing of other media currently associated with a voicemail, such as webpages, texts, etc. Screen 212 may also provide the opportunity for the user to select already attached files and remove them before the voicemail is transmitted to the recipient. Other options may be presented to the user, such as the option to select/create further content to be associated with the voicemail, the option to cancel the voicemail and/or the option to send the voicemail as currently configured with the listed files, media, webpages, etc. attached. If the user elects to send the voicemail as configured, a confirmation message such as that illustrated at screen 213 may be presented to the user. Screen 213 may include a summary of the action taken, and may also include the destination address, phone number, recipient's name, and/or other information. Screen 213 may be presented to the user for a predetermined amount of time and then removed, or screen 213 may remain displayed on a user device until acknowledged by the user. Any other variation of providing an acknowledgement to the user is contemplated.

Figure 3:
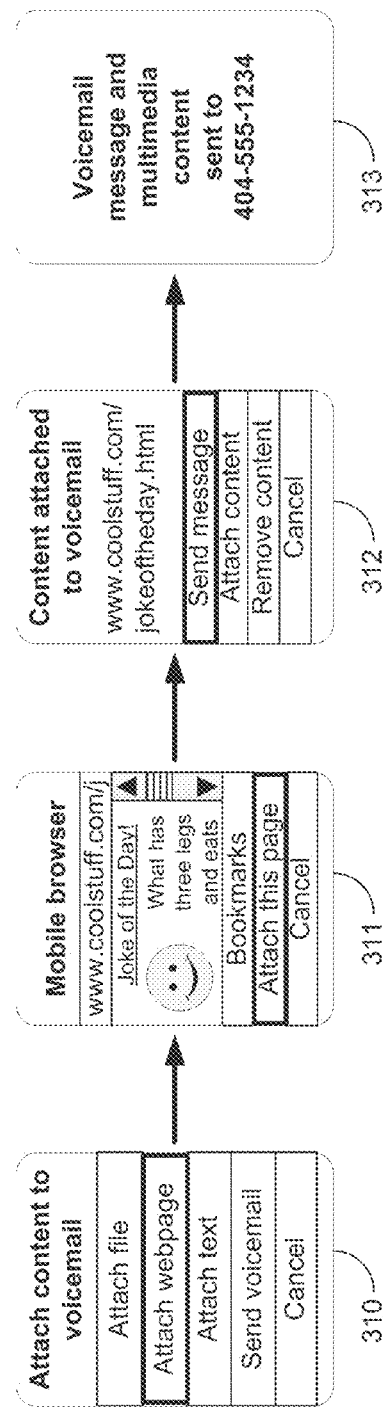
FIG. 3 illustrates example, non-limiting, representations of user interfaces that may be used in connection with multimedia and voicemail integration.

In one embodiment, a webpage may be attached or associated with a voicemail. As shown in FIG. 3, screen 310 may be presented to a user preparing a voicemail for transmission to a recipient. Among the options available are those listed in the description of screen 210 of FIG. 2, including the option to attach a webpage to a voicemail. Upon selection of the "Attach webpage" option, a user may be presented with screen 311. Screen 311 may display a mobile browser window with options to attach the contents or link of the currently displayed webpage to a voicemail. A user may manipulate a mobile browser to select a webpage by direct navigation (i.e. entering a webpage's address), selection from a list of bookmarks, redirection via a selected link, or by any other means.

Once a webpage is selected or otherwise chosen, screen 311 may provide the option to attach or associate the webpage with a voicemail. Alternative options may be presented on screen 311, such as the option to cancel the attachment process, or the option to select multiple webpages for attachment.

Upon selection of one or more webpages, a user may be presented with screen 312. Screen 312 may present to the user a visual listing or confirmation of webpages and/or other files, media, etc. currently associated with a voicemail. Screen 312 may also provide the opportunity for the user to select already attached webpages, files, media, etc. and remove them before the voicemail is transmitted to the recipient. Other options may be presented to the user, such as the option to select/create further content to be associated with the voicemail, the option to cancel the voicemail and/or the option to send the voicemail as currently configured with the listed webpages, media, files, etc. attached. If the user elects to send the voicemail as configured, a confirmation message such as that illustrated at screen 313 may be presented to the user. Screen 313 may include a summary of the action taken, and may also include the destination address, phone number, recipient's name, and/or other information. Screen 313 may be presented to the user for a predetermined amount of time and then removed, or screen 313 may remain displayed on a user device until acknowledged by the user. Any other variation of providing an acknowledgement to the user is contemplated.

Figure 4:
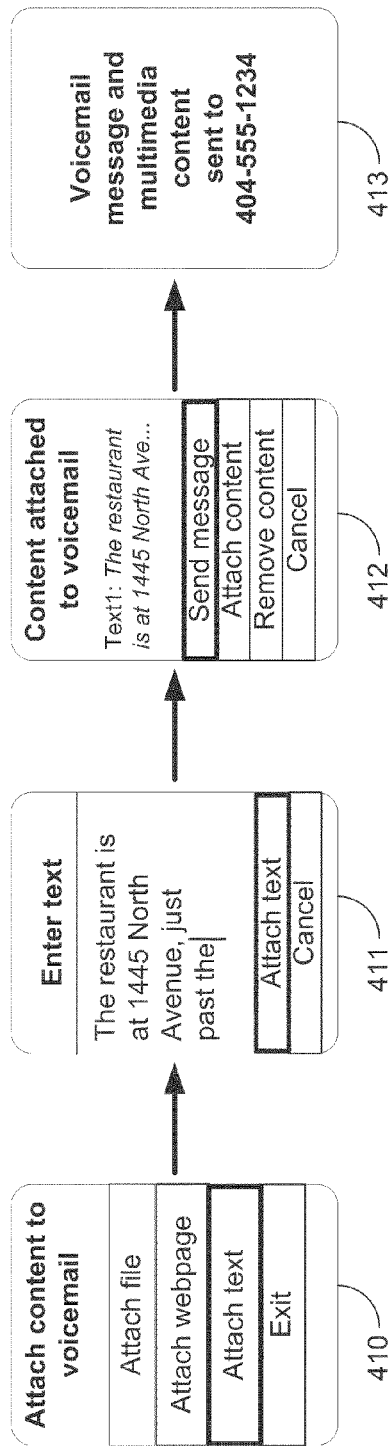
FIG. 4 illustrates example, non-limiting, representations of user interfaces that may be used in connection with multimedia and voicemail integration.

In some embodiments, a user may have the option to dynamically create multimedia content to be associated with a voicemail. As illustrated in FIG. 4, a user may be presented with the option to create media, such as text, to be associated with a voicemail. In alternative embodiments, a user may be presented with the options to create an image or a video clip, for example by operating a device's camera, and/or create a sound file, for example by operating a device's microphone and audio recording components. Other types of media may be created and associated with a voicemail, and all such embodiments are contemplated as within the scope of the present disclosure. If a user selects an option to create media content, the user may be presented with a screen such as screen 411, where a user may create the content. In one embodiment, screen 411 allows a user to enter text that will be attached to a voicemail as a text file or text message. Alternatively, at screen 411 a user may be permitted to create a sound, image, or video file or content that can then be associated with a voicemail. Screen 411 may also provide the user the option to cancel the multimedia attachment process and/or the option to attach the created content to a voicemail.

Screen 412 may be presented to a user following the creation and attachment of multimedia content. Screen 412 may present to the user a visual listing or confirmation of created media, webpages, other files, etc. currently associated with a voicemail. Screen 412 may also provide the opportunity for the user to select already attached user-created media, webpages, files, other media, etc. and remove them before the voicemail is transmitted to the recipient. Other options may be presented to the user, such as the option to select/create further content to be associated with the voicemail, the option to cancel the voicemail and/or the option to send the voicemail as currently configured with the listed user-created media, webpages, other media, files, etc. attached. If the user elects to send the voicemail as configured, a confirmation message such as that illustrated at screen 413 may be presented to the user. Screen 413 may include a summary of the action taken, and may also include the destination address, phone number, recipient's name, and/or other information. Screen 413 may be presented to the user for a predetermined amount of time and then removed, or screen 413 may remain displayed on a user device until acknowledged by the user. Any other variation of providing an acknowledgement to the user is contemplated.

Figure 5:
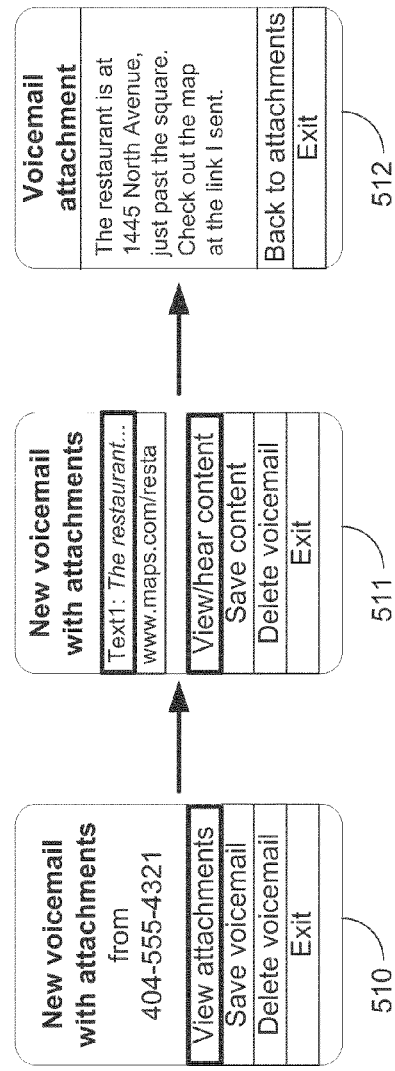
FIG. 5 illustrates example, non-limiting, exemplary representations of user interfaces that may be used in connection with multimedia and voicemail integration.

FIG. 5 illustrates a sequence of exemplary screens that may be presented to a recipient of a voicemail with associated multimedia content interacting with a voicemail or MMS system or server. At screen 510, a recipient may be presented with a notification that a new voicemail is available, and, in one embodiment, an indication that the voicemail has associated multimedia content. Note that in other embodiments, a recipient may receive a notification of a voicemail and/or an indication that multimedia content is associated with a voicemail audibly or with alternative indicators, and all such embodiments are contemplated as within the scope of the present disclosure. A recipient may be presented with options to save the voicemail, delete the voicemail, view or execute multimedia voicemail attachments, and/or exit or otherwise acknowledge the notification without hearing the voicemail or viewing/executing attached content.

If a recipient elects to view content associated with a voicemail, screen 511 may be generated and presented to the user. Screen 511 may include a listing of multimedia content associated with a voicemail and options to select and view, hear, and/or execute the associated content, save the associated content, delete the associated content, and/or exit screen 511. Other options may be provided to a recipient at screen 511 or in similar screens, and all such options are contemplated as within the scope of the present disclosure.

If a recipient chooses to view, hear, or execute associated content, screen 512 may be presented to the recipient. Note that the recipient may view, hear, or execute associated content before, during, or after listening to the audible voice message portion of the voicemail. Screen 512 may display visible multimedia content associated with a voicemail by displaying the text of the content, a webpage associated with the content (in one embodiment within a browser), displaying an image or video associated with the content, etc. Alternatively, or in addition to displaying the content, screen 512 may reflect the playing of audio portions of associated content or the execution of an application or other executable file associated with the voicemail. On screen 512, a recipient may also be presented with options, such as the option to return to a listing of associated content such as that of screen 511, or an option to exit screen 512. Other options may be provided to a recipient at screen 512 or in similar screens, and all such options are contemplated as within the scope of the present disclosure.

FIG. 6 illustrates an exemplary method 600 of implementing aspects of the present disclosure. The method of FIG. 6 may be implemented by a voicemail system, an MMS system, a user device, a network device, and/or any other appropriately configured device and/or system, and any combination thereof. At block 610, a voice message may be received. Such a voice message may be received at a voicemail server or MMS server as described herein, or on any other server, device, component, or system configured to facilitate the association of multimedia content with voicemail. The voice message may be the audible portion of a voicemail that may be stored and/or processed as a recorded voice message. At block 620, a determination may be made as to whether multimedia content is to be attached or otherwise associated with the voicemail. This determination may be made based on user input, for example user selection of an option to attach or associate multimedia content with a voicemail through the operation of an interface such as those illustrated in FIGS. 2, 3, and 4. Other means of determining whether multimedia content is to be associated with a voicemail are contemplated, including determining based on audible user input or automated processes are contemplated. If it is determined at block 620 that no multimedia content is to be associated with the voicemail, then at block 650 a notification is sent to the recipient that a voicemail is available, and any other processing may be performed, such as storage of the voicemail and related data, associating time, date, recipient and sender data with the voicemail, etc.

If at block 620 it is determined that multimedia content is to be associated with the voicemail, the content is obtained and associated with the voicemail at block 630. Obtaining the content may include uploading content specified by a user from a user's device or a specified device, storing an indication of a location of the content (such as a webpage address), or any other means of obtaining content or a pointer, address, or other indicator of such content. In some embodiments, an interface may be provided to obtain content such as those illustrated in FIGS. 2, 3, and 4. At block 630, the content may also be associated with the voicemail. This may be accomplished using any of a variety of means. In one embodiment, content may be directly attached to a voicemail such that the voicemail, associated voicemail data, and associated multimedia content is bundled into a single data unit that is stored and/or transmitted to a recipient. Alternatively, a voicemail may contain one or more references, pointers, addresses, and/or other means that indicate the location and/or other characteristics of multimedia content. Such references may be used by an appropriately configured device and/or software to locate and acquire the associated multimedia content on the instruction of a voicemail system or a user of such a system. The references multimedia content may be located on a component of a voicemail system, or on a component of a MMS system, or any other device or component where it can be retrieved and/or read when needed. In alternative embodiments, multimedia content may be associated with a voicemail using other means, and all such means are contemplated as within the scope of the present disclosure.

In one embodiment, at block 630 a user may associate a tag or other identifier with a word, time of play, or other characteristic of the audible voice portion of a voicemail or with any other characteristic of the voicemail, including characteristics of the multimedia content associated with the voicemail. The voicemail system may associate the tag or other identifier with the multimedia content and may automatically render such content when the voicemail is received by the recipient by detecting the tag or identifier and automatically executing or rendering the content associated with that tag or identifier. For example, when composing a voicemail and associating content, a user may specific that a certain music file is to be played when the user says "song", or that a certain website is to be accessed when the voice portion of the message reached one minute. When playing the audible voice portion of the voicemail, a voicemail or MMS system or a user device may automatically render the associated music file when the word "song" is detected or automatically execute a web browser and go to the associated webpage. Other tags and identifiers may be used to trigger automatic execution or rendering of associated multimedia content.

At block 640, a determination may be made as to whether additional content is to be associated with the voicemail. A user may be presented with the option to associate additional content with a voicemail after selecting content to be associated with the voicemail. This option may be presented to a user through interfaces such as those shown in FIGS. 2, 3, and 4, or through other means. If further content is to be associated with the voicemail, method 600 returns to block 630. If not, at block 650 a notification is transmitted to the intended recipient of the voicemail, and any further processing maybe performed, such as storage of the voicemail and related data, associating time, date, recipient and sender data with the voicemail, etc. A confirmation may also be presented to a user that a voicemail has successfully been generated. Such a confirmation may include recipient data, time and date data, voicemail and associated content data, etc. One example of such a confirmation is illustrated in FIGS. 2, 3, and 4, and other confirmations are contemplated.

FIG. 7 illustrates an exemplary method 700 of implementing aspects of the present disclosure. The method of FIG. 7 may be implemented by a voicemail system, a MMS system, a user device, a network device, and/or any other appropriately configured device and/or system, and any combination thereof. At block 710, a notification of an available voicemail may be received and presented to a user. The actions of block 710 may include a presentation of the notification by the user device, or they include the transmission of instructions from a voicemail system to a user device instructing the user device to present a notification to the user. The notification may include a indication that multimedia content is associated with the voicemail, a listing of the available content, and/or an option for the user to select multimedia content to view, hear, execute, etc. In one embodiment, the notification may be similar to the screens illustrated in FIG. 5.

At block 720, a determination may be made as to whether associated content has been selected for viewing, hearing, executions, etc. This determination may be made based on user input received while a user is interacting with interfaces such as those illustrated in FIG. 5. Note that the recipient may select to view, hear, or execute associated content before, during, or after listening to the audible voice message portion of the voicemail. In one embodiment, the user who composed the voicemail may have associated a tag or other identifier with a word, time of play, or other characteristic of the audible voice message portion of a voicemail, and at block 720, when the tag, or other identifier is detected, the multimedia content may be automatically rendered on the user device. For example, when composing a voicemail and associating content, a user may specific that a certain music file is to be played when the user says "song". When playing the audible voice message portion of the voicemail, a voicemail or MMS system or the recipient's device may automatically render the associated music file when the word "song" is detected. Other tags and identifiers may be used to trigger automatic execution or rendering of associated multimedia content.

If no content has been selected, or there has otherwise been no instruction to view, hear, execute, etc. associated content, at block 750 the voicemail may be processed as normal. Such processing may include presenting and detecting selection of options to save, review, and/or delete the voicemail, download the content associated with the voicemail without viewing/hearing/executing the content, etc.

If at block 720, multimedia content associated with the voicemail is selected for viewing, hearing, executing, etc., at block 730, the content is presented to the user. This may include the visual presentation of the content on a display, playing the an audio and/or video portion of associated content, executing an application or other content associated with the voicemail, or any other activity that renders content such that is can be recognized and consumed by a recipient. The content may be rendered remotely and transmitted to the recipient's device, for example, audio or video may be rendered on a voicemail or MMS server or system and streamed to the recipient's device. Alternatively, the content may be transmitted as a file or otherwise downloaded onto the recipient's device, and the recipient's device may then render the content such that the content is perceptible by the recipient. In such an embodiment, the content may be transmitted as a file or downloaded to the recipient's device when the recipient selects an option to view, hear, execute, etc. the content, or the content may be transmitted before, during, or after the notification of an available voicemail is transmitted. Any means of rendering content may be used, and all such means are contemplated as within the scope of the present disclosure.

Once content is presented to the user at block 730, a determination may be made as to whether further content is to be presented to the user at block 740. This determination may be made based on user input received while a user is interacting with interfaces such as those illustrated in FIG. 5. If further content is to be presented to the user, method 700 returns to block 720. Otherwise, if no further content presentation request is detected, at block 750 the voicemail may be processed further. Such processing may include presenting and detecting selection of options to save, review, and/or delete the voicemail, download the content associated with the voicemail without viewing/hearing/executing the content, etc.

Figure 8:
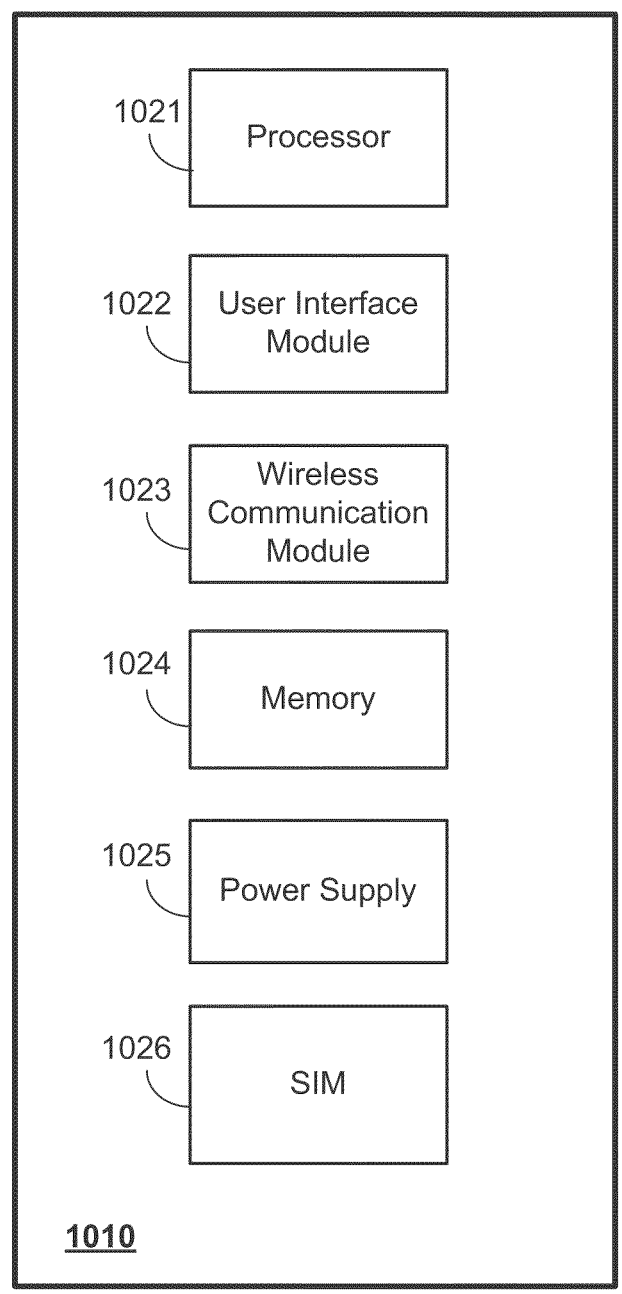
FIG. 8 is a block diagram of a non-limiting, exemplary wireless device that may be used in connection with multimedia and voicemail integration.

FIG. 8 illustrates an example wireless device 1010 that may be used in connection with an embodiment. References will also be made to other figures of the present disclosure as appropriate. For example, wireless devices 111 and 121 may each be a wireless device of the type described in regard to FIG. 8, and may have some, all, or none of the components and modules described in regard to FIG. 8. It will be appreciated that the components and modules of wireless device 1010 illustrated in FIG. 8 are illustrative, and that any number and type of components and/or modules may be present in wireless device 1010. In addition, the functions performed by any or all of the components and modules illustrated in FIG. 8 may be performed by any number of physical components. Thus, it is possible that in some embodiments the functionality of more than one component and/or module illustrated in FIG. 8 may be performed by any number or types of hardware and/or software.

Processor 1021 may be any type of circuitry that performs operations on behalf of wireless device 1010. In one embodiment, processor 1021 executes software (i.e., computer readable instructions stored in a computer readable medium) that may include functionality related to integrating multimedia content with voicemail, for example. User interface module 1022 may be any type or combination of hardware and/or software that enables a user to operate and interact with wireless device 1010, and, in one embodiment, to interact with a system or software enabling the user to place, request, and/or receive calls and voicemail, and/or a system or software enabling the user to view, modify, or delete related software objects. For example, user interface module 1022 may include a display, physical and/or "soft" keys, voice recognition software, microphone, speaker and the like. Wireless communication module 1023 may be any type of transceiver or any combination of hardware and/or software that enables wireless device 1010 to communicate with wireless network equipment, for example, network 101, or any other type of wireless communications network or network equipment. Memory 1024 enables wireless device 1010 to store information, such as voicemail notifications, multimedia content, software to interact with voicemail systems, and voicemail preferences. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 9:
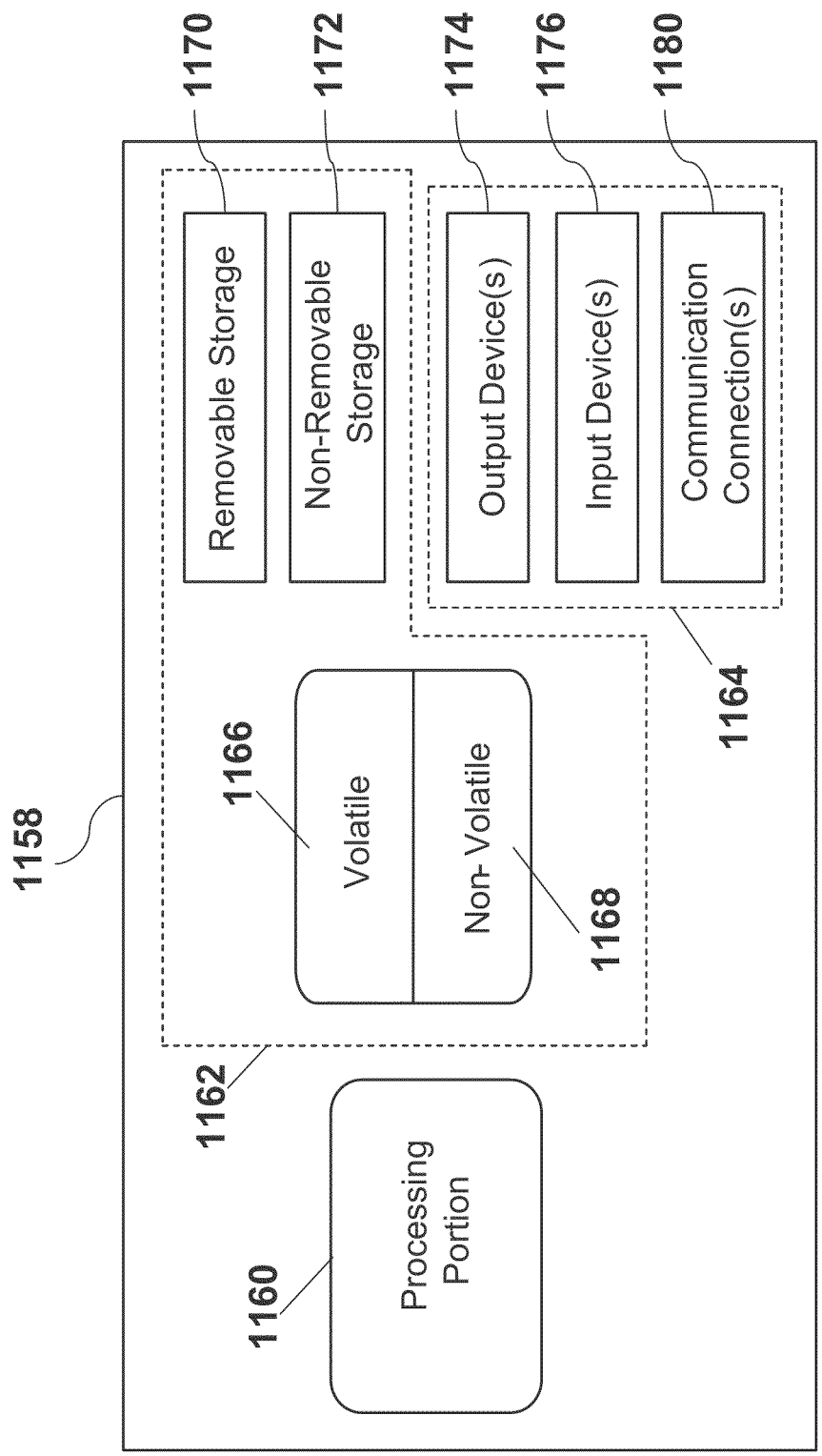
FIG. 9 is a block diagram of a non-limiting, exemplary processor in which multimedia and voicemail integration may be implemented.

FIG. 9 is a block diagram of an example processor 1158 which may be employed in any of the embodiments described herein, including as one or more components of wireless devices 111 and 121, as one or more components of network equipment or related equipment, such as any component shown in FIG. 1, and/or as one or more components of any third party system or subsystem that may implement any portion of the subject matter described herein. It is emphasized that the block diagram depicted in FIG. 9 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 9, the processor 1158 comprises a processing portion 1160, a memory portion 1162, and an input/output portion 1164. The processing portion 560, memory portion 562, and input/output portion 1164 are coupled together (coupling not shown in FIG. 9) to allow communications between these portions. The input/output portion 1164 is capable of providing and/or receiving components, commands, and/or instructions, utilized to, for example, integrate multimedia content with voicemail, transmit and receive voicemail notifications, transmit, receive, store and process multimedia content, execute software to interact with voicemail systems, receive and store voicemail preferences, and/or perform any other function described herein.

The processor 1158 can be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing voicemail, calls, other telephonic communications, etc. For example, the memory portion is capable of storing voicemail preferences and/or software capable of processing call requests, receiving calls, voicemail, multimedia content, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 can also contain the communications connection(s) 1180 that allow the processor 1158 to communicate with other devices, for example through network equipment as illustrated in FIG. 1. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

The network illustrated in FIG. 1 may comprise any appropriate telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how integration of multimedia content with voicemail may be implemented with stationary and non-stationary network structures and architectures in order to provide integration of multimedia content with voicemail. It can be appreciated, however, that methods and systems for providing integration of multimedia content with voicemail such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the systems and methods for integrating multimedia content with voicemail can be applied independently of the method of data transport, and do not depend on any particular network architecture, or underlying protocols.

Figure 10:
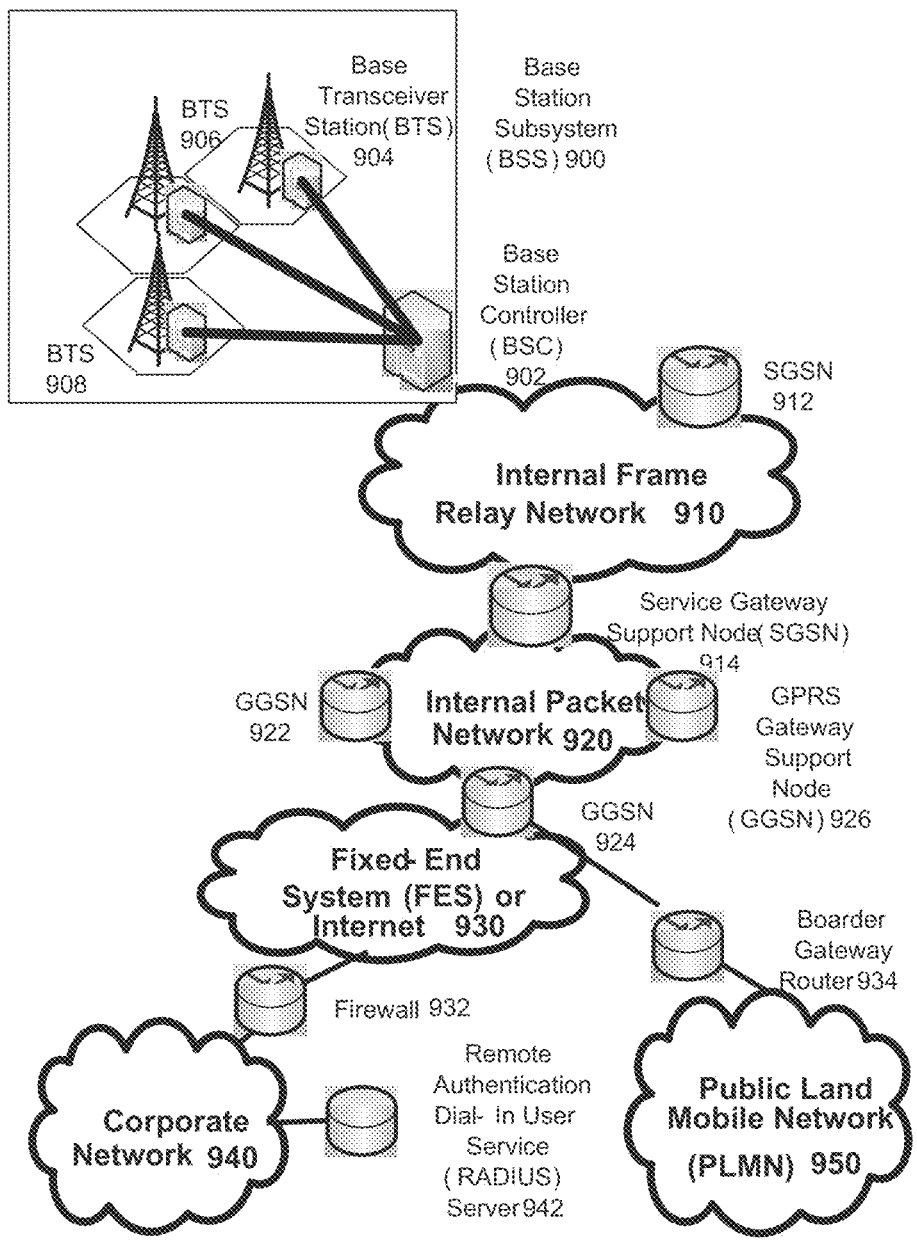
FIG. 10 is a block diagram of an exemplary packet-based mobile cellular network environment, such as a GPRS network, in which multimedia and voicemail integration may be implemented.

FIG. 10 depicts an overall block diagram of an exemplary packet-based mobile cellular network environment, such as a GPRS network, in which the systems and methods for integrating multimedia content with voicemail such as those described herein can be practiced. In an example configuration, network 101 as illustrated in FIG. 1 may be encompassed by or interact with the network environment depicted in FIG. 10. Similarly, wireless devices 111 and 121 may communicate or interact with a network environment such as that depicted in FIG. 10. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., wireless devices 111 and 121) become connected to the wireless network. In exemplary fashion, the packet traffic originating from user devices (e.g., wireless devices 111 and 121) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 11:
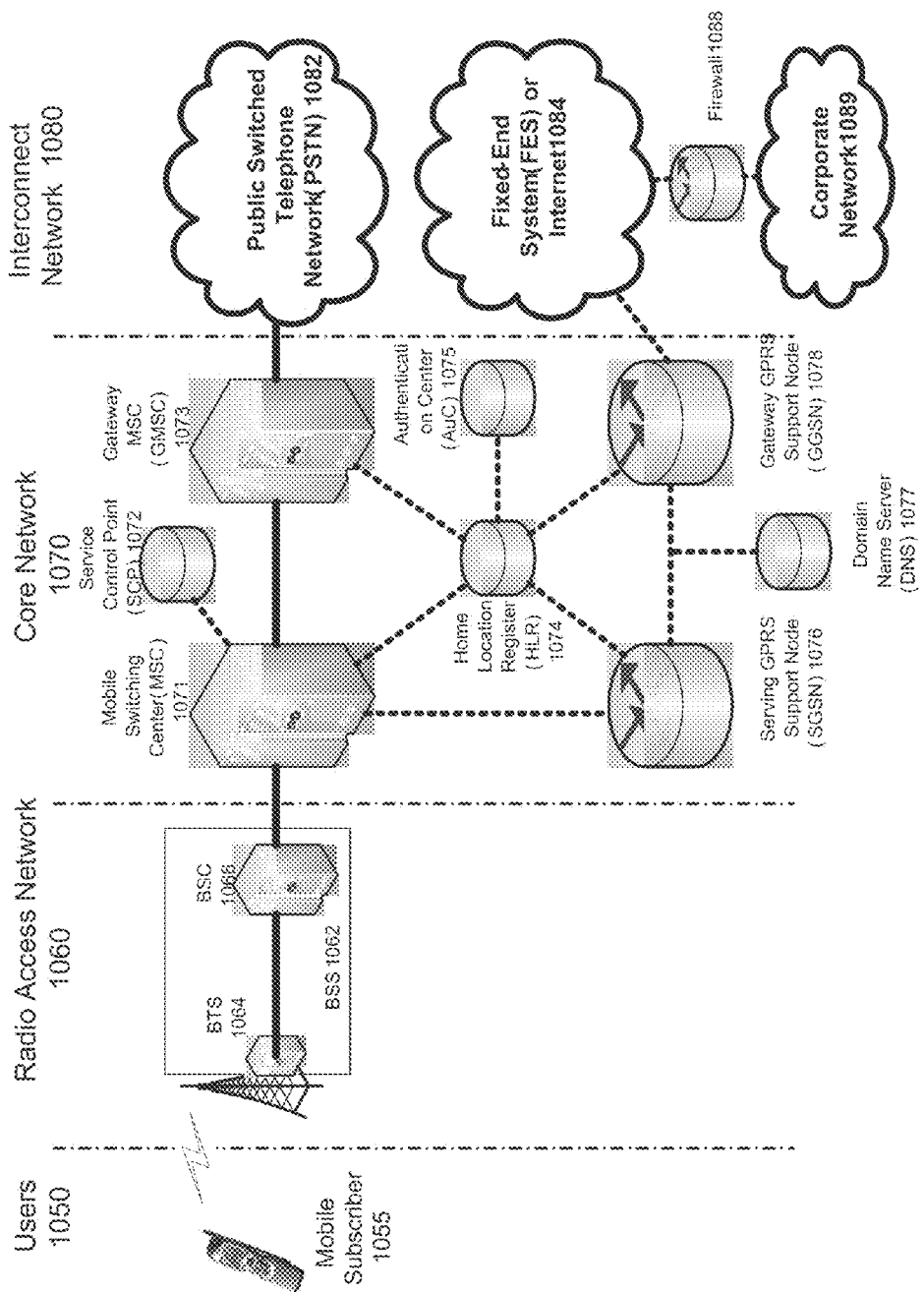
FIG. 11 illustrates a non-limiting, exemplary architecture of a typical GPRS network, segmented into four groups, in which multimedia and voicemail integration may be implemented.

FIG. 11 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 11). In an example embodiment, the device depicted as mobile subscriber 1055 may comprise wireless devices 111 and 121. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 11, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as wireless devices 111 or 121, used by an end user of a mobile cellular service or a wireless provider. When a mobile subscriber turns on his or her mobile device, the mobile device may go through an attach process by which the mobile device attaches to an SGSN of the GPRS network. In FIG. 11, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of integrating multimedia content with voicemail such as those described herein can include but are not limited to Gateway GPRS Support Node tables, Fixed End System router tables, firewall systems, VPN tunnels, and any number of other network elements as required by the particular digital network.

Figure 12:
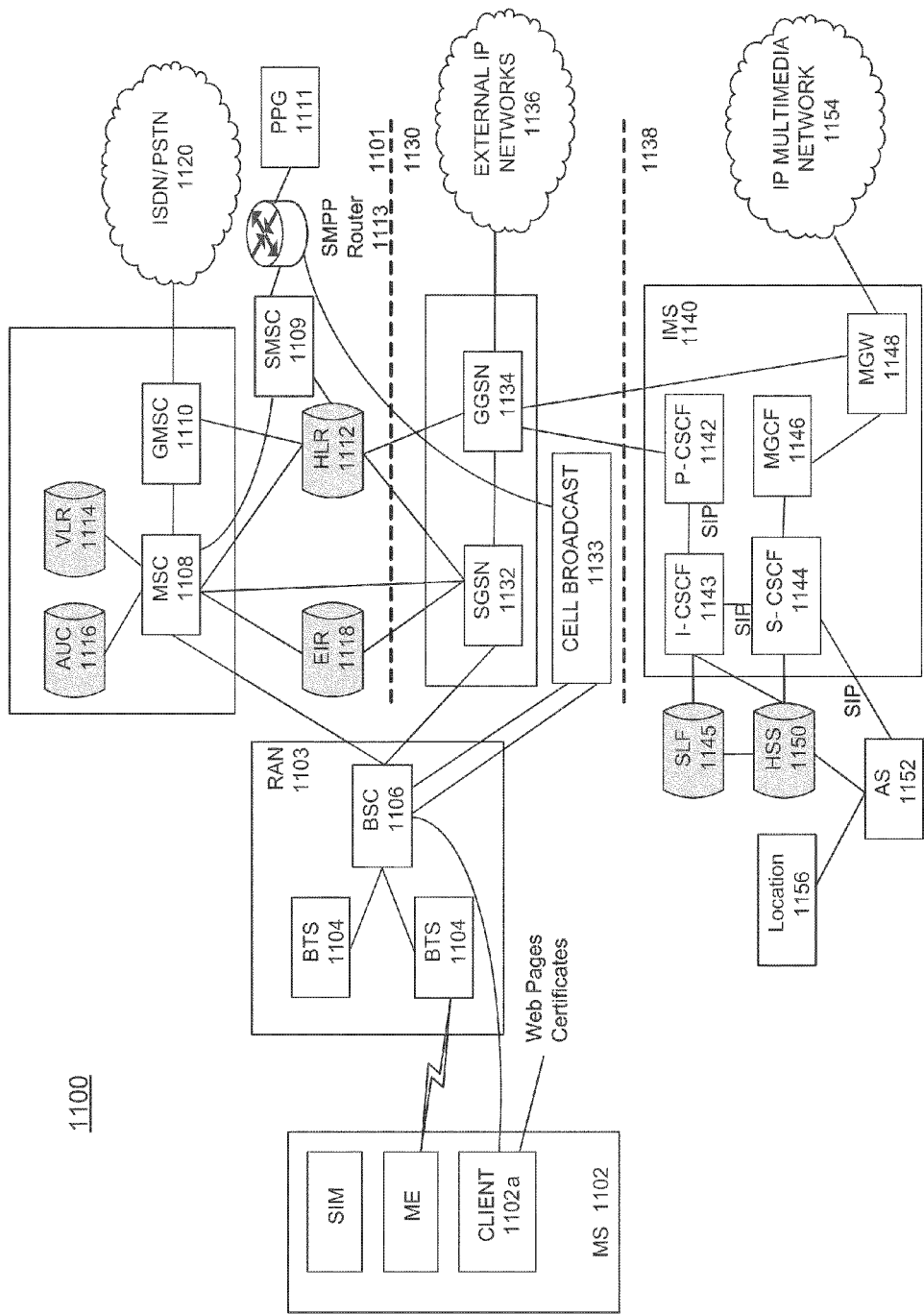
FIG. 12 illustrates a non-limiting alternate block diagram of an exemplary GSM/GPRS/IP multimedia network architecture in which multimedia and voicemail integration may be implemented.

FIG. 12 illustrates another exemplary block diagram view of a GSM/GPRS/IP multimedia network architecture 1100 in which the systems and methods for providing integrating multimedia content with voicemail such as those described herein can be incorporated. As illustrated, architecture 1100 of FIG. 12 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., wireless devices 111 and 121) that is used by mobile subscribers, in one embodiment with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision is based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the pre-defined area. This registration, however, does not indicate the actual physical location of the mobile telephones outside the pre-defined area.

While example embodiments of systems and methods for integrating multimedia content with voicemail have been described in connection with various communications devices and computing devices/processors, the underlying concepts can be applied to any communications or computing device, processor, or system capable of implementing the multimedia voicemail systems and methods described. The various techniques described herein can be implemented in connection with hardware or software or, where appropriate, with a combination of both. Thus, the methods and apparatuses for integrating multimedia content with voicemail, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for integrating multimedia content with voicemail. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems for integrating multimedia content with voicemail as described herein can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for integrating multimedia content with voicemail. When implemented on a general-purpose processor, the program code combines with the processor to provide a unique apparatus that operates to invoke the functionality of a multimedia voicemail system. Additionally, any storage techniques used in connection with a voicemail system can invariably be a combination of hardware and software.

While the integration of multimedia content with voicemail has been described in connection with the various embodiments of the various figures, it is to be understood that other similar embodiments can be used or modifications and additions can be made to the described embodiment for performing the same function of integrating multimedia content with voicemail without deviating therefrom. For example, one skilled in the art will recognize that integrating multimedia content with voicemail as described in the present application may apply to any environment, whether wired or wireless, and may be applied to any number of such devices connected via a communications network and interacting across the network. Therefore, integrating multimedia content with voicemail should not be limited to any single embodiment, but rather should be construed in breadth and scope in accordance with the appended claims.

What is claimed is:

1. A wireless network device comprising:
a memory comprising instructions; and
a processor coupled to the memory that, when executing the instructions, causes performance of operations comprising:
a transceiver receiving a request from a first device to create a voicemail message;
the transceiver receiving audible content of the voicemail message from the first device;
the transceiver transmitting to the first device an audible prompt for additional content for the voicemail message;
the transceiver receiving from the first device an audible request to include content of a webpage with the voicemail message, wherein the audible request comprises a spoken address of the webpage;
the transceiver receiving the content of the webpage;
the processor associating the content of the webpage with the voicemail message; and
the transceiver transmitting a notification of the voicemail message to a recipient device.

2. The wireless network device of claim 1, wherein the operations further comprise the processor associating a transcription of the spoken address of the webpage with the voicemail message.

3. The wireless network device of claim 1, wherein the operations further comprise the transceiver transmitting an instruction to the first device that causes the first device to present a user interface for user selection of multimedia content.

4. The wireless network device of claim 1, wherein the operation of the processor associating the content of the webpage with the voicemail message comprises the processor storing the content of the webpage in a memory as a multimedia portion of the voicemail message.

5. The wireless network device of claim 3, wherein the operations further comprise:
the transceiver receiving an indication of a selection of multimedia content at the user interface; and
the processor associating the multimedia content with the voicemail message.

6. The wireless network device of claim 1, wherein the operation of the processor associating the content of the webpage with the voicemail message comprises the processor associating a network address of the webpage with the voicemail message.

7. The wireless network device of claim 1, wherein the operations further comprise:
the transceiver receiving a second audible request to include text with the voicemail message, wherein the second audible request comprises spoken content;
the processor transcribing the spoken content; and
the processor associating the spoken content with the voicemail message.

8. The wireless network device of claim 1, wherein the operations further comprise the transceiver receiving from the first device a tag associated with a portion of the audible content of the voicemail message, and the processor associating the tag with the content of the webpage.

9. The wireless network device of claim 8, wherein the operations further comprise the transceiver transmitting an instruction to the recipient device to present the content of the webpage upon detection of the tag during presentation of the voicemail message.

10. The wireless network device of claim 9, wherein the presentation of the voicemail message comprises rendering the audible content of the voicemail message.

11. A method, comprising:
detecting, by a voicemail server in a wireless network, a request from a first device to create a voicemail message;
receiving, by the voicemail server, audible content of the voicemail message from the first device;
transmitting, from the voicemail server to the first device, an audible prompt for additional content for the voicemail message;
receiving, by the voicemail server from the first device, an audible request to include content of a webpage with the voicemail message, wherein the audible request comprises a spoken address of the webpage;
obtaining, by the voicemail server, the content of the webpage;
associating, by the voicemail server, the content of the webpage with the voicemail message; and
transmitting a notification of the voicemail message from the voicemail server to a recipient device.

12. The method of claim 11, further comprising associating a transcription of the spoken address of the webpage with the voicemail message.

13. The method of claim 11, further comprising receiving from the first device a tag associated with a portion of the audible content of the voicemail message, and associating the tag with the content of the webpage.

14. The method of claim 11, further comprising:
receiving a second audible request to include text with the voicemail message, wherein the second audible request comprises spoken content;
transcribing the spoken content; and
associating the spoken content with the voicemail message.

15. The method of claim 11, wherein associating the content of the webpage with the voicemail message comprises associating a network address of the webpage with the voicemail message.

16. A computer-readable medium that is not a transient signal, the computer-readable medium comprising executable instructions, which when executed by a processor, cause the processor to effectuate operations comprising:
detecting a request from a first device to create a voicemail message;
receiving audible content of the voicemail message from the first device;
transmitting to the first device an audible prompt for additional content for the voicemail message;
receiving from the first device, an audible request to include content of a webpage with the voicemail message, wherein the audible request comprises a spoken address of the webpage;
obtaining the content of the webpage;
associating the content of the webpage with the voicemail message; and
transmitting a notification of the voicemail message to a recipient device.

17. The computer-readable medium of claim 16, wherein the operations further comprise associating a transcription of the spoken address of the webpage with the voicemail message.

18. The computer-readable medium of claim 16, wherein the operations further comprise receiving from the first device a tag associated with a portion of the audible content of the voicemail message, and associating the tag with the content of the webpage.

19. The computer-readable medium of claim 16, wherein the operations further comprise:
receiving a second audible request to include text with the voicemail message, wherein the second audible request comprises spoken content;
transcribing the spoken content; and
associating the spoken content with the voicemail message.

20. The computer-readable medium of claim 16, wherein the operation of associating the content of the webpage with the voicemail message comprises associating a network address of the webpage with the voicemail message.

* * * * *